United States Patent
Chen et al.

(10) Patent No.: US 12,404,205 B2
(45) Date of Patent: Sep. 2, 2025

(54) METHOD FOR RECOVERING AND REUSING QUARTZ POWDER WASTE IN OUT-OF-TUBE DEPOSITION PROCESS

(71) Applicant: JIANGSU ETERN OPTICAL FIBER TECHNOLOGY CO., LTD., Suzhou (CN)

(72) Inventors: Hongda Chen, Suzhou (CN); Longfei Wang, Suzhou (CN); Fan Li, Suzhou (CN); Lihong Sui, Suzhou (CN); Yonglin Luo, Suzhou (CN)

(73) Assignee: JIANGSU ETERN OPTICAL FIBER TECHNOLOGY CO., LTD., Suzhou (CN)

( * ) Notice: Subject to any disclaimer, the term of this patent is extended or adjusted under 35 U.S.C. 154(b) by 317 days.

(21) Appl. No.: 17/923,927

(22) PCT Filed: Jul. 20, 2020

(86) PCT No.: PCT/CN2020/102937
§ 371 (c)(1),
(2) Date: Nov. 8, 2022

(87) PCT Pub. No.: WO2021/223325
PCT Pub. Date: Nov. 11, 2021

(65) Prior Publication Data
US 2023/0167016 A1    Jun. 1, 2023

(30) Foreign Application Priority Data
May 8, 2020 (CN) .......................... 202010380533.2

(51) Int. Cl.
C03B 37/012    (2006.01)
C01B 33/12     (2006.01)
C03C 13/04     (2006.01)

(52) U.S. Cl.
CPC .......... *C03C 13/046* (2013.01); *C01B 33/126* (2013.01); *C03B 37/01211* (2013.01);
(Continued)

(58) Field of Classification Search
CPC .......... C03B 2205/13; C03B 37/01245–01248
See application file for complete search history.

(56) References Cited

U.S. PATENT DOCUMENTS 6,047,568 A * 4/2000 Campion ................ C03C 1/006
                                                    65/17.2
8,033,142 B2 * 10/2011 Pedrido ............. C03B 37/01248
                                                    65/412
(Continued)

FOREIGN PATENT DOCUMENTS

CN    1989078 A     6/2007
CN    102285758 A   12/2011
(Continued)

*Primary Examiner* — Erin Snelting
(74) *Attorney, Agent, or Firm* — SZDC Law PC

(57) ABSTRACT

The present application provides a method for recovering and reusing quartz powder waste in an out-of-tube deposition process. The quartz powder recovered by this method meets the optical performance requirements for the preparation of an optical fiber preform rod having a functional cladding, reduces the production cost, and solves the problem of environmental pollution. Also, the present invention further provides a method for preparing an optical fiber preform rod by using the recovered quartz powder. The method reduces and simplifies the difficulty in the manufacturing of a core rod of a preform rod, and simplifies the difficulty in the manufacturing of some preform rods of special structures.

4 Claims, 4 Drawing Sheets

(52) U.S. Cl.
CPC .... *C03B 37/01245* (2013.01); *C03B 37/0126* (2013.01); *C03B 2201/12* (2013.01); *C03B 2201/20* (2013.01); *C03C 2213/00* (2013.01)

(56) References Cited

U.S. PATENT DOCUMENTS

| | | | | |
|---|---|---|---|---|
| 2004/0206128 | A1* | 10/2004 | Zilnyk | C03B 37/02736 |
| | | | | 65/412 |
| 2008/0107385 | A1* | 5/2008 | Ohga | C03B 37/01248 |
| | | | | 65/412 |
| 2011/0100063 | A1* | 5/2011 | Desorcie | C03B 37/01282 |
| | | | | 65/412 |
| 2016/0257599 | A1 | 9/2016 | Trevor | |
| 2016/0257602 | A1* | 9/2016 | Trevor | C03B 37/01282 |

FOREIGN PATENT DOCUMENTS

| | | | |
|---|---|---|---|
| CN | 102325730 A | | 1/2012 |
| CN | 103449455 A | * | 12/2013 |
| CN | 104556070 A | | 4/2015 |
| CN | 109553294 A | | 4/2019 |
| CN | 109665713 A | | 4/2019 |

\* cited by examiner

METHOD FOR RECOVERING AND REUSING QUARTZ POWDER WASTE IN OUT-OF-TUBE DEPOSITION PROCESS

This application is the National Stage Application of PCT/CN2020/102937, filed on Jul. 20, 2020, which claims priority to Chinese Patent Application No. 202010380533.2, filed on May 8, 2020, which is incorporated by reference for all purposes as if fully set forth herein.

FIELD OF THE INVENTION

The present invention relates to the technical field of optical fibers, and specifically to a method for recovering and reusing quartz powder waste in an out-of-tube deposition process.

DESCRIPTION OF THE RELATED ART

When optical fibers are manufactured, the purified raw materials need to be formed into a glass rod meeting certain requirements, which is called "optical fiber preform rod". Optical fiber preform rod is the original rod material for drawing optical fiber, which has an inner layer that is a core layer of high refractive index (n1) and an outer layer that is a cladding of low refractive index (n2), and needs to have a satisfactory refractive index distribution and geometric size. A typical optical fiber preform rod is about 10-25 nm in diameter, and about 60-120 nm in length.

During the preparation of optical fibers for communications, the preparation of the optical fiber preform rod is important. The manufacture of optical fiber preform rod includes the manufacture of the core rod and the manufacture of the outer cladding. That is, the core rod (including a core layer and an optical cladding) is prepared first, and then the cladding is deposited outside the core rod to prepare an optical fiber preform rod. At present, the technologies used to prepare optical fiber preform rods mainly include in-tube methods represented by plasma chemical vapor deposition (PCVD) and improved chemical vapor deposition (MCVD), and out-of-tube methods represented by vapor axial deposition (VAD) and outside vapor deposition (OVD). The outer cladding is manufactured mainly by direct synthesis by OVD and assembly of quartz sleeve.

When the optical fiber preform rod is prepared by out-of-tube deposition, since the reaction waste gas in the deposition chamber needs to be extracted, a certain negative pressure is provided to the deposition chamber by a tail gas treatment device. During the extraction process, the tail gas treatment device will not only extract the reaction waste gas, but also extract certain reaction product, that is, the silica nanopowder. When a bag dust collector-type dry tail gas treatment device is used, a silica nanopowder with relatively lower moisture content and lower salt content is obtained. Direct emission of these particles into the air will cause dust pollution. At present, the main method of waste disposal is landfill. However, the landfill will still cause certain harm to the environment, especially the soil, and the resources are wasted.

At present, the treatment of tail gas produced in the deposition process of optical fiber preform rod mainly includes wet and dry treatment. The tail gas collected during deposition is currently commonly used for the preparation of white carbon black.

When the optical fiber preform rod is prepared by a sleeve method, the manufacturing process of the optical fiber preform rod is transitioned from a one-step method to a two-step method, to improve the production efficiency. A sleeved preform rod consists of a pre-prepared core rod and sleeve, which is vacuumized at the end of a tail handle of the sleeve, and subjected to melt shrinkage in a drawing furnace or an extension furnace, to finally form an optical fiber or an optical fiber preform rod. The sleeved preform rod has a structure schematically shown in FIG. 1.

The core rod of the sleeved preform rod includes a core layer and an inner cladding. The inner cladding is quartz glass with adjusted refractive index by doping to some extent. The sleeve acts as an outer cladding of the optical fiber preform rod, which is generally simple quartz glass. The light guide structure of the entire optical fiber preform rod is mainly realized by the design of the core rod, so the preparation of the core rod is critical. However, low-attenuation and highly bending resistant core rods are difficult to be prepared through some deposition processes, and hard to be attained directly through the sleeved rod process.

$SiO_2$ in the tail gas produced in the preparation of optical fiber preform rod by out-of-tube deposition is collected, which is used as a raw material to prepare optical fiber preform rods. In this way, the waste becomes a resource, to reduce the cost, and solve the problem of environmental pollution. However, due to the low purity of $SiO_2$ in the tail gas produced in the preparation of the optical fiber preform rod by out-of-tube deposition, it cannot be directly used as a raw material to prepare the optical fiber preform rod. Therefore, how to recover $SiO_2$ to allow it to meet the requirements of reuse is an urgent problem to be solved in this field.

Chinese Patent No. CN109553294A provides a method for manufacturing an optical fiber preform rod with the solid waste from VAD or OVD process as a raw material, which includes specifically coaxially arranging the target rod from top to bottom, fixedly connecting the core rod to a quartz plate, and placing them in a quartz tube; introducing $SiO_2$ collected from the tail gas from the VAD or OVD process into 1PVA solution, stirring uniformly, drying, and grinding in a quartz crucible to give a powder; feeding the particles to the quartz tube, covering a quartz press plate, and applying a pressure, to obtain a semifinished product by dry pressing; and putting the semifinished product into a quartz reaction tube arranged in a sintering furnace, and oxidizing, dewatering, and sintering to prepare an optical fiber preform rod meeting the standards. However, in the method described in this patent, the prepared quartz product cannot be doped, to form an area having optical functions. Moreover, due to the use of PVA, there may be a certain amount of carbon residue, affecting the tensile strength of the optical fiber prepared with the preform rod.

At present, there is no report on how to use quartz powder collected in the deposition of tail gas to prepare a functional cladding of the optical fiber preform rod.

SUMMARY OF THE INVENTION

In view of the technical problem existing in the prior art, the present invention provides a method for recovering quartz powder waste in the process of preparing an optical fiber preform rod by out-of-tube deposition, and a method of using the recovered quartz powder to prepare a functional quartz cladding for an optical fiber preform rod in connection with an optical fiber preform rod sleeve process.

To solve the technical problem, the following technical solution is adopted in the present invention. In a first aspect, the present invention provides a method for recovering quartz powder waste in the process of preparing an optical fiber preform rod by out-of-tube deposition, which includes the following steps:

(1) acid washing: reacting a quartz powder collected in the treatment of a tail gas from deposition of an optical fiber preform rod in a hydrochloric acid solution, precipitating the quartz powder out and draining the acid solution on surface thereof, and washing the quartz powder with pure water;

(2) separation: draining the surface water from the quartz powder diluted with pure water obtained in Step (1), centrifuging, and separating the quartz powder;

(3) drying: drying the quartz powder obtained in Step (2) in a dryer lined with high-purity quartz and drying so that the quartz powder has a moisture content of 2% or less;

(4) calcinating: calcinating the quartz powder dried in Step (3) in a device lined with high-purity quartz;

(5) crushing: taking out the calcinated final product, placing in a device lined with high-purity quartz, crushing and grinding to an average particle size of 0.2-1 mm, and preferably 0.2-0.5 mm; and (6) pre-water removal: placing the ground quartz powder in a sealed container, and introducing a nitrogen-chlorine mixture containing 15%-25% chlorine.

In the method, in the reacting a quartz powder collected in the treatment of a tail gas from deposition of an optical fiber preform rod in a hydrochloric acid solution in Step (1), the reaction temperature is 40° C.-60° C., and the reaction time is 2-4 h; and after draining the acid solution on the surface, the quartz powder is washed three or more times with pure water. For example, where the collection condition is harsh, the number of washes is increased; and preferably, the hydrochloric acid solution has a concentration of 5%-10% by weight.

Preferably, the drying temperature in Step (3) is 70° C.-85° C.

Preferably, in Step (4), the quartz powder dried in Step (3) is calcinated in a device lined with high-purity quartz at 400° C.-600° C. for 20-30 min, and then maintained at 200° C.-300° C. for 6-12 h. When the calcinating temperature is high, such as 600° C., the time of maintaining at 200° C.-300° C. can be shortened to 6 h. Conversely, when the calcinating temperature is low, the maintaining time is correspondingly prolonged.

Preferably, in Step (6), the ground quartz powder is placed in a sealed container, a nitrogen-chlorine mixture containing 15%-25% chlorine is introduced, and the quartz powder is maintained at 50-60° C. for not less than 12 h, for example, up to 24 h if the average particle size is 0.5 mm or more.

In a second aspect, the present invention further provides a method for preparing an optical fiber preform rod having a functional quartz cladding, which includes the following steps:

(S1) assembly of preform rod: assembling a cladding sleeve having a tail handle and a core rod having a tail handle with an acid after acid washing, filling the gap between the cladding sleeve and the core rod with the quartz powder prepared in the treatment of the tail gas after assembly, and then filling high-purity quartz column in the tail tube, where more preferably, the high-purity quartz column is a high-purity quartz column of a special structure, for example, a quartz column having a central hole and longitudinal shallow grooves on the surface at one end as shown in FIG. 5;

(S2) mounting of tail cover plate: mounting a tail cover plate having a gas gauge, a gas inlet, a gas extraction port and a Teflon sealing ring at the end of the tail handle of the preform rod, to fix the core rod in place;

(S3) hanging the preform rod to a melt shrinkage device, doping the quartz powder, and melt shrinking and sintering to obtain a transparent glass rod.

In the method for preparing an optical fiber preform rod having a functional quartz cladding, the gas gauge in Step (S2) is mounted at an outlet of the gas extraction port, which is provided with a valve at the back and configured to displays positive and negative pressures; a valve is mounted at the gas inlet; three sealing rings are provided, and fixed, from the inside to the outside, at an end of the tail handle of the core rod, an end of the tail high-purity quartz column, and an end of the tail handle of the sleeve, to form two annular gaps between the tail handle of the core rod and the tail high-purity quartz column and between the tail high-purity quartz column and the tail handle of the sleeve. The two annular gaps are allowed to communicate with the quartz powder area by providing a groove on an outer surface at the other end of the tail high-purity quartz column.

Preferably, the doping the quartz powder in Step (S3) comprises: closing the valve at the gas outlet, introducing a gas mixture consisting of a doping gas, helium, argon or nitrogen via the gas inlet, slowly putting the preform rod into the heating furnace while the gas is continuously introduced, and slowly heating to 1200-1400° C. to fully react the doping gas with the quartz powder, where preferably the doping gas is silicon tetrachloride or silicon tetrafluoride.

Preferably, the melt shrinking and sintering in Step (S3) comprises: after the doping gas is fully reacted with the quartz powder, gradually cooling to 600-800° C., opening the gas extraction valve, extracting the gas mixture inside the preform rod under vacuum, then opening the valve at the gas inlet, supplying helium or a gas mixture of helium and a doping gas to the interior of the preform rod, gradually heating to a melt shrinkage temperature after the reading of the gas gauge is stable, and melt shrinking and sintering the cladding sleeve, the doped quartz powder and the core rod into a complete transparent glass rod.

Preferably, in Step (S3), the doping gas is silicon tetrachloride or silicon tetrafluoride.

In Step (S3), a different doping gas has a different effect. The introduction of silicon tetrafluoride is to generate a functional cladding with a lower refractive index than undoped quartz glass; and the introduction of silicon tetrachloride is to generate a functional cladding with a higher refractive index than undoped quartz glass. For example, the refractive index distribution along a cross section of an optical fiber preform rod having a functional cladding prepared by doping with silicon tetrachloride is schematically shown in FIG. 6; and the refractive index distribution along a cross section of an optical fiber preform rod having a functional cladding prepared by doping with silicon tetrafluoride is schematically shown in FIG. 7.

A third aspect of the present invention further provides an optical fiber preform rod, prepared by the aforementioned method of the present invention.

Beneficial Effects of the Present Invention

1. The present invention provides a method for recovering quartz powder as a deposition waste in the production process of an optical fiber preform. The quartz powder recovered by this method meets the optical performance requirements for the preparation of an optical fiber preform rod having a functional cladding, as shown by the functional cladding area where the refractive index is elevated or lowered shown in FIG. 6 and FIG. 7. Further, the method provided in the present invention can reduce the production cost, and solves the problem of environmental pollution.

The inventors find that the collected deposition waste can be prepared into a quartz powder after acid washing, separation by centrifugation, drying, calcinating, crushing, and grinding, and the vitrified quartz prepared later contains high content of —OH, causing that the optical fiber prepared with the optical fiber preform rod has a higher attenuation coefficient at 1383 nm. Through numerous experimental studies, the present inventors finally find that the hydroxyl groups in vitrified quartz can be significantly reduced by dewatering the ground quartz powder with a nitrogen-chlorine mixture containing 15%-25% chlorine. Thus, the technical problem of high attenuation coefficient at 1383 nm after the optical fiber preform rod is made into an optical fiber is overcome.

2. In the prior art, the core layer for an optical fiber preform rod having complicated refractive index profile design (multi layers of different refractive indices) and having a doping concentration requirement for the dopant is difficult to be formed by one-step deposition by a VAD or OVD apparatus. By the method provided in the invention, the operation of performing multiple depositions can be avoided, to simplify the manufacturing difficulty of the preform rod core rod.

3. The present invention also provides a method for simplifying the manufacturing difficulty of a preform rod with some special structures. for example, ultra-low-loss G652 optical fiber preform rod, G654 optical fiber preform rod, and G657optical fiber preform rod. To achieve the optical properties, some low-refractive-index areas or high-refractive-index areas need to be set. However, it is difficult to increase the doping concentration or to achieve the doping in an ordinary VAD or OVD process. Instead, the method for preparing an optical fiber preform rod having a functional quartz cladding provided in the present invention can solve this problem.

BRIEF DESCRIPTION OF THE DRAWINGS

The technical solution of the present application is further described below with reference to accompanying drawing in connection with embodiments.

DETAILED DESCRIPTION OF THE PREFERRED EMBODIMENTS

It should be noted that the embodiments and the features in the embodiments in the present application can be combined with each other without conflicts. The high-purity quartz powder in the present invention refers to a quartz powder with a purity of not less than 99.999%, and the high-purity quartz column refers to a quartz column made of quartz having material properties meeting or exceeding the GE214 standard. Unless otherwise explained, other terms involved in the present invention are interpreted in accordance with the conventional meaning in the art.

Example 1. Recovery and Treatment Method of Quartz Powder Collected after Dry Treatment of Tail Gas The quartz powder collected after treatment of the tail gas was added to a hydrochloric acid solution having a concentration of 5%-10%, and reacted at 50° C. for 2-4 h, to remove pollutants such as metal ions that might exist in the collection process (where the concentration of hydrochloric acid and the reaction time could be appropriately increased if the collection conditions were harsh). The reaction solution was allowed to stand, to precipitate the quartz powder gradually. The surface acid solution was drained, water was poured, and the quartz powder was washed and then allowed to stand. This step was repeated 3-5 times (where the number of dilutions and washes could be increased if the collection conditions were harsh). The surface water was drained, and then the quartz powder was separated by a centrifugal apparatus, placed in a dryer lined with high-purity quartz, and dried at 80° C. to a moisture content of 2% or less.

Then, the quartz powder was calcinated in a device lined with high-purity quartz at 400-600° C. for 20-30 min, and then maintained at 200° C. for 12 h (where the maintaining time could be shortened to 6 h if the calcinating temperature was higher). The calcinated final product was taken out, placed in a device lined with high-purity quartz, crushed and ground (to an average particle size controlled to 0.2-0.5 mm, or 1 mm).

The ground quartz powder was placed in a sealed container, a nitrogen-chlorine mixture containing 20% chlorine was introduced, and the quartz powder is maintained at 50° C. for 12 h or more (where the time could be increased to 24 h if the average particle size was 0.5 mm or more).

Chlorine in the sealed container was purged with argon or nitrogen. The obtained quartz powder could be used for the preparation of a functional cladding.

Figure 8:
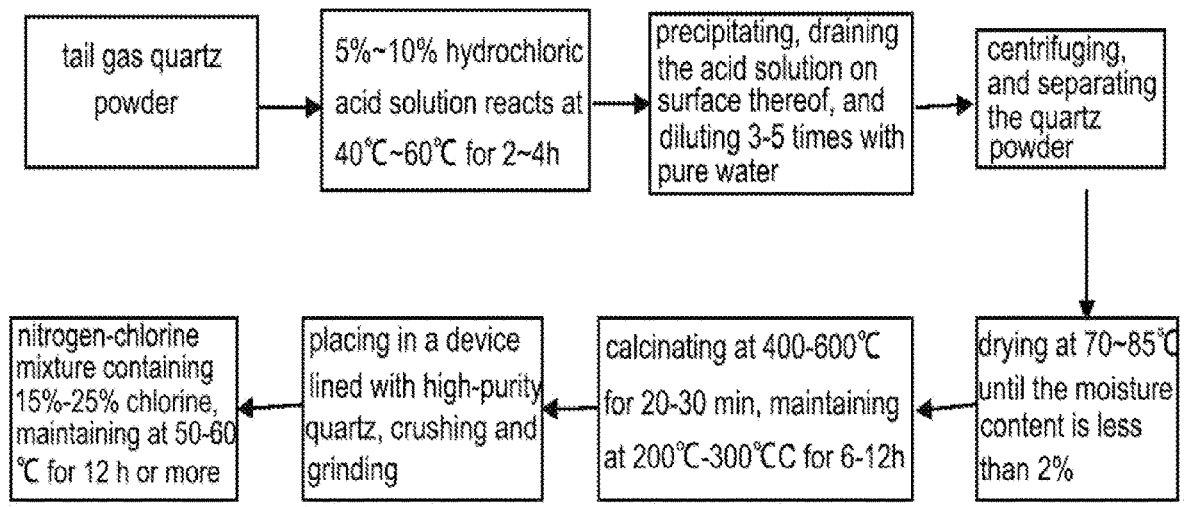
FIG. 8 is a flow chart of a method for treating quartz powder from tail gas treatment in Example 1 of the present application.

The flow chart of the above preparation method is shown in FIG. 8.

Example 2. Preparation of Optical Fiber Preform Rod Having Functional Cladding A quartz cladding sleeve and a pre-designed core rod were washed with an acid, and then assembled in a Class 100 clean space. After assembly, the gap between the cladding sleeve and the core rod was filled with the quartz powder prepared by the method in Example 1.

Figure 1:
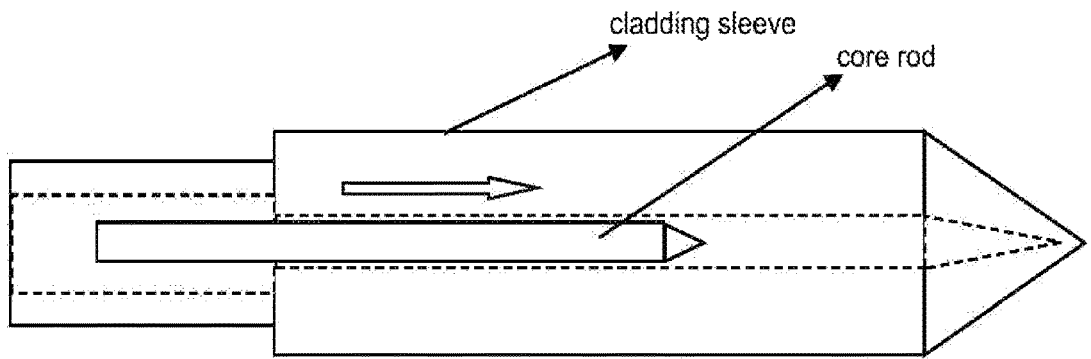
FIG. 1 is a schematic view showing the structure of a sleeved preform rod.
Figure 2:
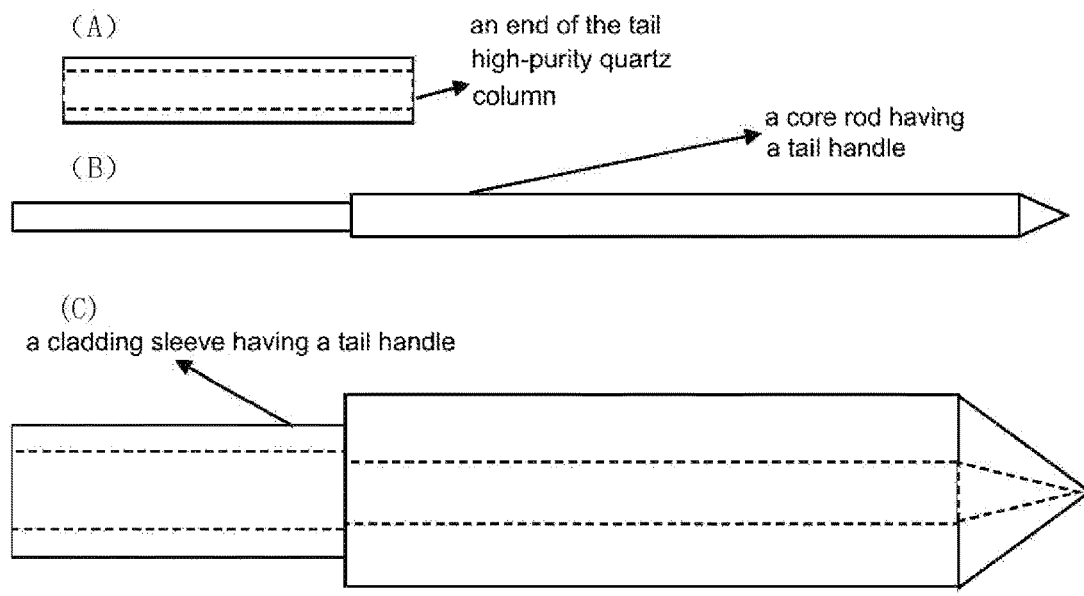
FIG. 2 is a schematic view showing the components of a preform rod before assembly.
Figure 3:
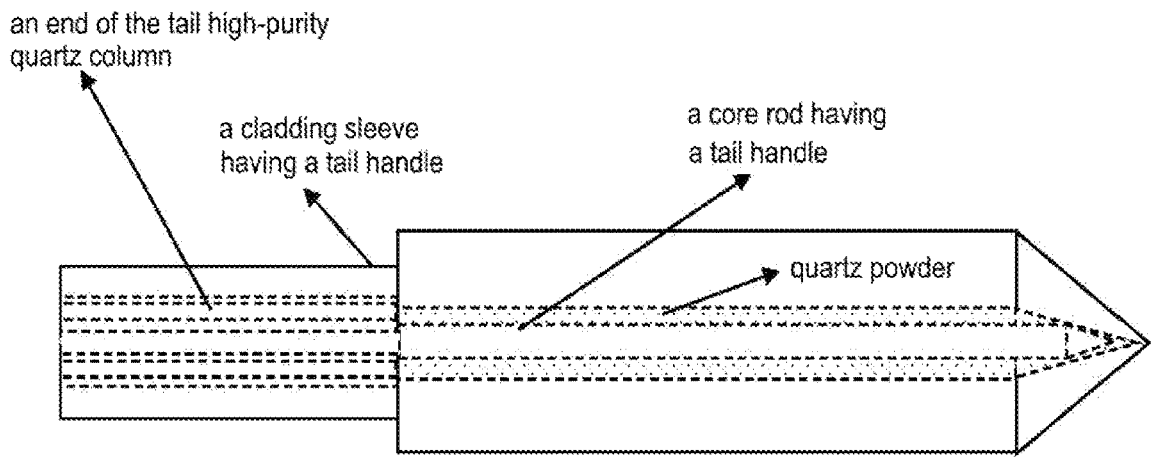
FIG. 3 is a schematic view showing a preform rod after each component in FIG. 2 is assembled and a quartz powder is filled.
Figure 4:
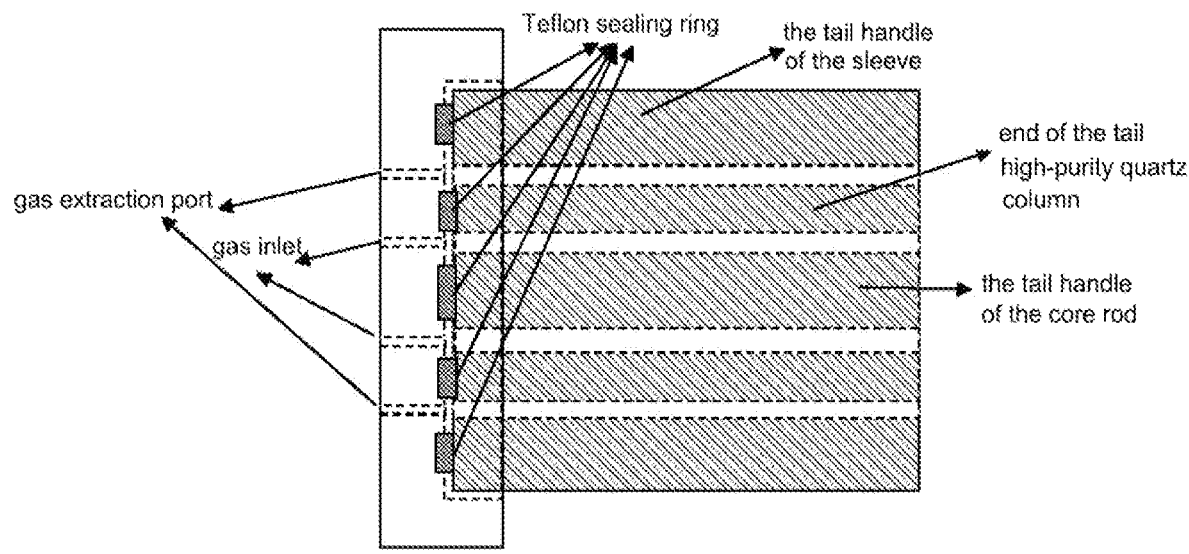
FIG. 4 is a schematic view showing the combined structure of a tail cover plate for a preform rod.

After the preform rod was assembled, a tail cover plate having a gas gauge (configured to display positive and negative pressure, mounted at an outlet of a gas extraction port, and provided with a valve at the back), a gas inlet (where a valve needs to be mounted), a gas extraction port and a Teflon sealing ring was mounted at the end of the tail handle of the preform rod, to fix the core rod in place. The cover plate was internally cooled with cooling water. The structure of the cover plate is shown in FIG. 4.

Figure 5:
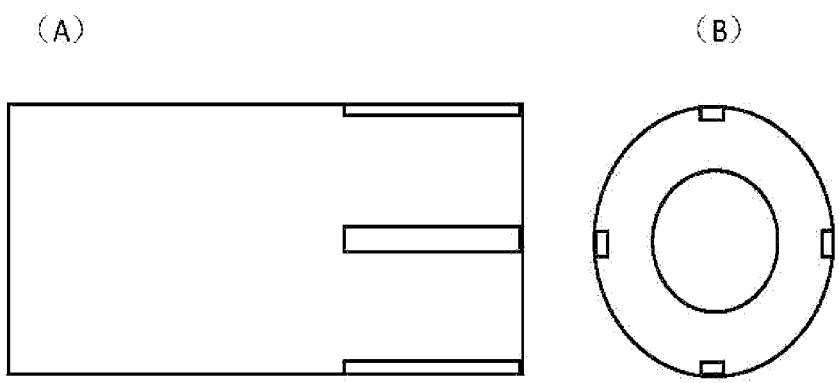
FIG. 5 is a schematic view showing the surface grooves on a high-purity quartz column.

Three sealing rings are fixed, from the inside to the outside, at an end of the tail handle of the core rod, an end of the tail high-purity quartz column, and an end of the tail handle of the sleeve, to form two annular gaps between the tail handle of the core rod and the tail high-purity quartz column and between the tail high-purity quartz column and the tail handle of the sleeve. The two annular gaps are allowed to communicate with the quartz powder area by providing a groove on an outer surface at the other end of the tail high-purity quartz column, as shown in FIG. 5.

After the tail cover plate was mounted, the preform rod was hanged to a melt shrinkage device. The valve at the gas outlet was closed, and a gas mixture consisting of a doping gas (silicon tetrachloride or silicon tetrafluoride), helium, and other inert gases (argon, nitrogen, and so on) at a certain ratio was introduced via the gas inlet. The gas was continuously introduced, and the reading of positive pressure on the gas gauge at the gas extraction port was observed. The gas inlet was closed after the pressure meeting the process requirement was reached. Then, the preform rod was allowed to slowly descend into a heating furnace and slowly heated to 1200° C. to 1400° C. (the temperature depends on the desired doping source, the desired doping concentration, and other process requirements), and maintained at this temperature for a period of time to ensure the full reaction with the dopant. Then the temperature was lowered to 800° C., the valve at the gas extraction port was opened, and the gas mixture inside the preform rod was extracted under vacuum. When a certain process pressure was reached, the valve at the gas inlet was opened, and helium (or a gas mixture of helium and a doping gas) was introduced to the interior of the preform rod. After the reading of the gas gauge was stable, the preform rod was gradually heated to a melt shrinkage temperature, and the cladding sleeve, the doped quartz powder and the core rod were melt shrunk and sintered into a complete transparent glass rod.

Figure 6:
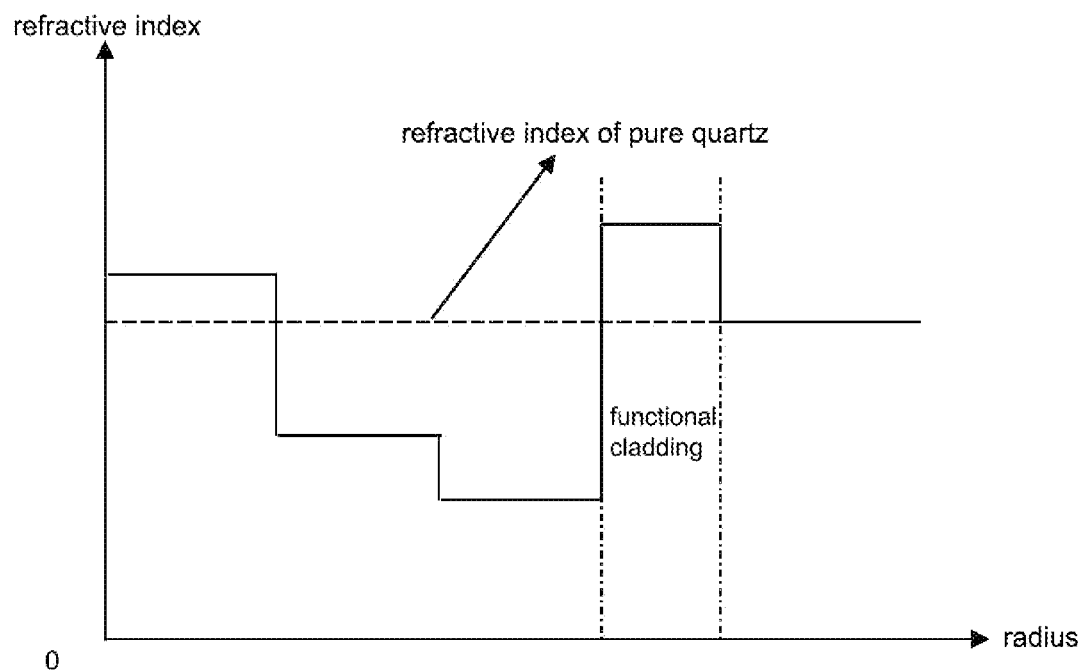
FIG. 6 is a schematic diagram showing the refractive index along a cross section of an optical fiber preform rod having a functional cladding prepared by doping with silicon tetrachloride in Example 2 of the present application.
Figure 7:
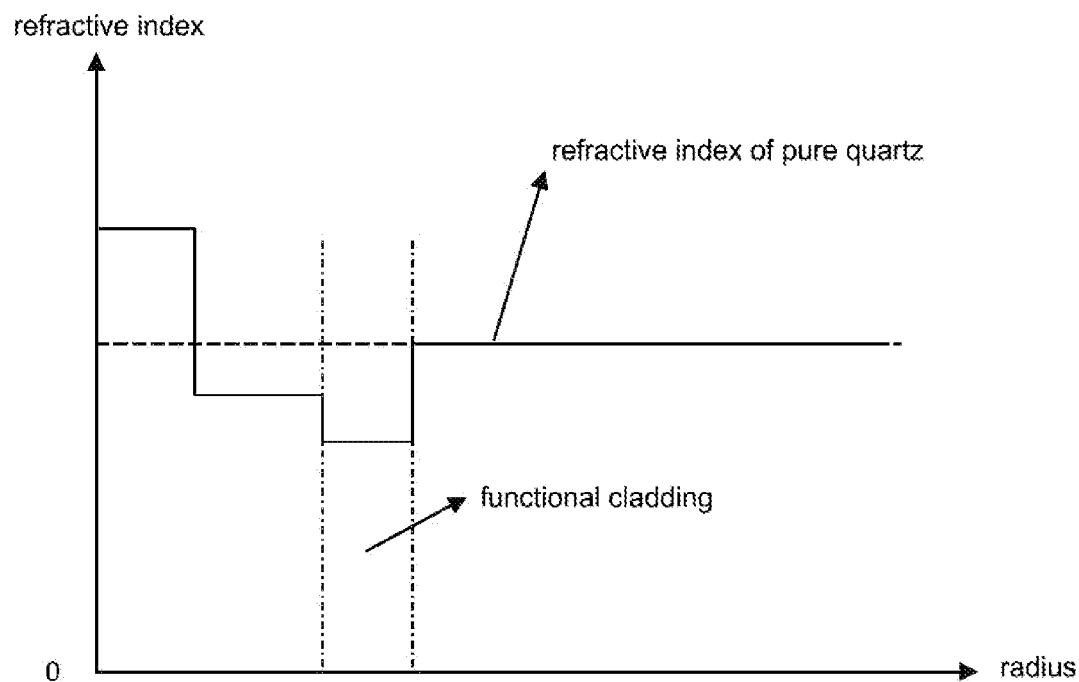
FIG. 7 is a schematic diagram showing the refractive index along a cross section of an optical fiber preform rod having a functional cladding prepared by doping with silicon tetrafluoride in Example 2 of the present application.

During the process, a different doping gas has a different effect. The introduction of silicon tetrafluoride is to generate a functional cladding with a lower refractive index than undoped quartz glass; and the introduction of silicon tetrachloride is to generate a functional cladding with a higher refractive index than undoped quartz glass. The refractive index distribution along a cross section of the optical fiber preform rod prepared is schematically shown in FIGS. 6 and 7.

As suggested by desirable embodiments of the present application, a variety of changes and modifications can be made by those skilled in the art according to the disclosure and embodiments described above, the suggestions without departing from the technical idea of the present application. The technical scope of the present invention is not limited to the disclosure of the specification, and the technical scope thereof is defined by the scope of the claims.

What is claimed is:

1. A method for preparing an optical fiber preform rod having a functional quartz cladding, comprising steps of:
   (S0) recovering quartz powder waste in an out-of-tube deposition process, comprising steps of
      (1) acid washing: reacting a quartz powder collected in a treatment of a tail gas from deposition of an optical fiber preform rod in a hydrochloric acid solution, precipitating the quartz powder out and draining the acid solution on a surface thereof, and washing the quartz powder with pure water;
   (2) separation: draining surface water from the quartz powder diluted with pure water obtained in Step (1), centrifuging, and separating the quartz powder;
   (3) drying: drying the quartz powder obtained in Step (2) in a dryer lined with high-purity quartz and drying to a moisture content of 2% or less;
   (4) calcinating: calcinating the quartz powder dried in Step (3) in a device lined with high-purity quartz;
   (5) crushing: taking out the calcinated quartz, placing in a device lined with high-purity quartz, crushing and grinding to an average particle size of 0.2-1 mm; and
   (6) pre-water removal: placing the ground quartz powder in a sealed container, and introducing a nitrogen-chlorine mixture containing 15%-25% chlorine;
   (S1) assembly of optical fiber preform rod and filing filling: assembling a cladding sleeve having a cladding tail handle and a core rod having a core tail handle after Step (1) acid washing, filling a gap between the cladding sleeve and the core rod with the quartz powder prepared in step (S0) after assembly, and then filling a tail high-purity quartz column with the quartz powder;
   (S2) mounting of tail cover plate: mounting a tail cover plate having a gas gauge, a gas inlet, a gas extraction port and three polytetrafluoroethylene sealing rings, to fix the core rod in place; and
   (S3) hanging the optical fiber preform rod to a melt shrinkage device, doping the quartz powder, and then melt shrinking and sintering to obtain a transparent glass rod, wherein the doping gas is silicon tetrachloride or silicon tetrafluoride.

2. The method according to claim 1, wherein the gas gauge in Step (S2) is mounted at an outlet of the gas extraction port, which is provided with a first valve at a back of the gas extraction port and configured to display positive and negative pressures; a second valve is mounted at the gas inlet; the three polytetrafluoroethylene sealing rings are provided, and fixed, at an end of the core tail handle of the core rod, an end of the tail high-purity quartz column, and an end of the cladding tail handle of the cladding sleeve, to form two annular gaps between the core tail handle of the core rod and the tail high-purity quartz column and between the tail high-purity quartz column and the cladding tail handle of the cladding sleeve, the two annular gaps are allowed to communicate with a quartz powder area by providing a groove on an outer surface at an other end of the tail high-purity quartz column.

3. The method according to claim 1, wherein the doping the quartz powder in Step (S3) comprises: closing a first valve at an outlet of the gas extraction port, introducing a gas mixture consisting of a doping gas, helium, argon and nitrogen via the gas inlet, putting the preform rod into a heating furnace while the gas mixture is continuously introduced, and heating to 1200-1400° C. to fully react the doping gas with the quartz powder.

4. The method according to claim 3, wherein the melt shrinking and sintering in Step (S3) comprises: after the doping gas is fully reacted with the quartz powder, gradually cooling to 600-800° C., opening the first valve at the gas extraction port, extracting the gas mixture inside the preform rod under vacuum, then opening a second valve at the gas inlet, supplying the gas mixture to the interior of the preform rod, gradually heating to a melt shrinkage temperature after a reading of the gas gauge is stable, and melt shrinking and sintering the cladding sleeve, the doped quartz powder and the core rod into the transparent glass rod.

* * * * *